Nov. 27, 1945.       H. OZLEK       2,389,811
JOINT FOR POLES AND THE LIKE
Filed July 20, 1943        2 Sheets-Sheet 1
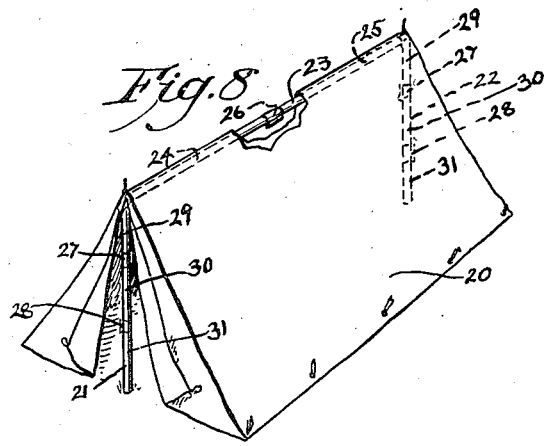
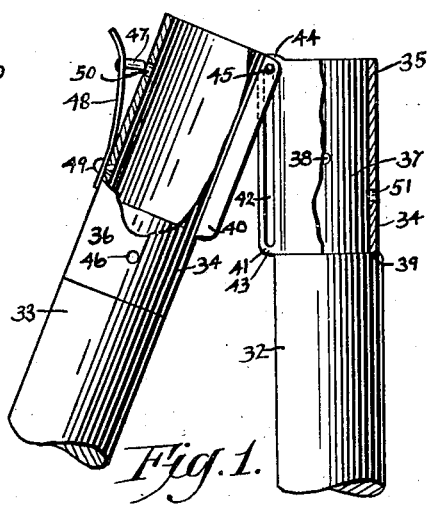
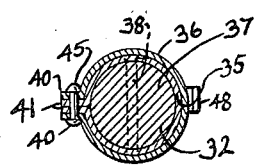
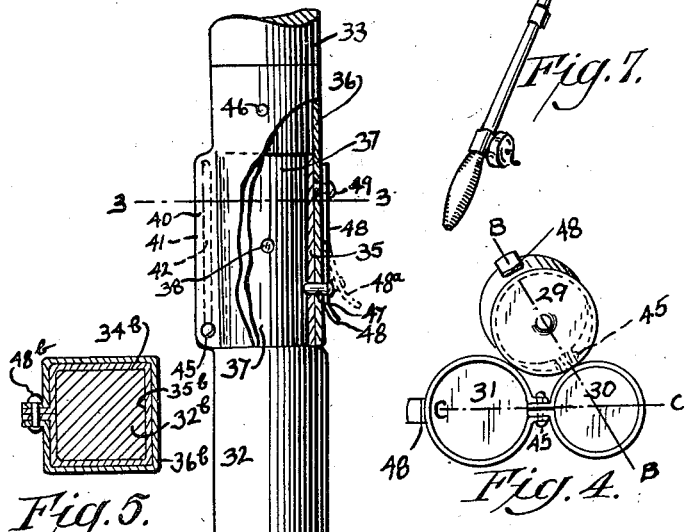
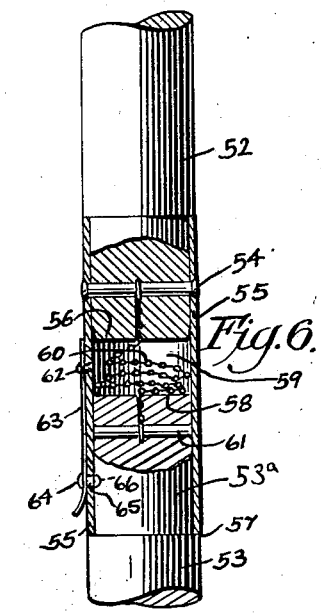
Inventor,
Herman Ozlek.
By his attorney.
J. Edward Thebaud.

Nov. 27, 1945.    H. OZLEK    2,389,811
JOINT FOR POLES AND THE LIKE
Filed July 20, 1943    2 Sheets-Sheet 2

Inventor,
Herman Ozlek,
by his attorney,
J. Edward Thebaud

Patented Nov. 27, 1945

2,389,811

UNITED STATES PATENT OFFICE 2,389,811

JOINT FOR POLES AND THE LIKE

Herman Ozlek, Philadelphia, Pa.

Application July 20, 1943, Serial No. 495,511

9 Claims. (Cl. 287—99)

This invention relates to joints for poles, rods, tubes or the like, particularly to that kind thereof adapted for releasably holding adjoining sections of poles, etc., in alignment, while preventing the main parts of the joint from becoming entirely separated from one another, when not holding said sections in alignment.

Among the objects of this invention is the provision of a form of pole or rod joint having loosely connected, telescoping members, adapted to hold adjoining parts of a pole, rod, tube or the like, in releasably tight, alignment as said members are held in fitting telescopic relation, but when released from such relation, to hold the pole parts loosely together, while the said pole parts are laid or nested together, to make a shorter package.

Another object is to provide in a joint, fulfilling the above named object, certain connecting means which will permit the telescopic sliding of one member over the other without said connecting means becoming disengaged.

A further object is to provide another form of pole or rod joint, having a tubular member acting as a fixed tubular projection to come in line with one of two adjoining pole parts and is adapted to telescope, in fitting and aligning relation, the adjoining end of the other pole part, and has in addition, extensible connecting means fixed to each of said adjoining pole parts, in position to be within said tubular projection to nest within a closed space between the ends of said adjoining pole parts, when said joint is holding said pole parts in alignment.

Another object of my invention is to provide a pole joint which, while fulfilling the above named objects, will be such, as to enable one to quickly assemble the pole parts in releasably, fixed alignment, affording a stiff pole from end to end, or to disassemble the same without having to touch or fix the joint parts by hand, either when putting the pole parts in stiff alignment, or when putting the pole parts in nested relation to one another.

A further object is to provide a pole joint construction which, while fulfilling any of the above-named objects, will lend itself readily to ordinary pressed sheet metal, manufacture, and thus reduce its cost of making in mass production, particularly where comparatively large quantities are required in as short a time as possible, and a further object is to provide means for releasably locking the members of the joint, when in telescopic alignment.

With these and other objects, which will hereinafter appear, my invention resides in certain constructions, fulfilling one or all of the above named objects. Various forms of my invention are illustrated in the drawings, the construction of each form is described in detail, the functioning of each form is explained and what I claim is set forth.

In the drawings,

Figure 1 is a sectional elevation of one form of pole joint embodying my invention and is shown here disassembled from telescopic relation.

Figure 2 is an elevation of the joint shown in Figure 1, but here shown having members of the joint in telescopic relation.

Figure 3 is a section taken on the line 3—3, of Figure 2.

Figure 4 is an end view of nested pole parts fitted with joints shown in Figures 1 and 2.

Figure 5 shows a cross-section of a similar joint to that shown in Figure 3, but in this case it is adapted for a square sectioned pole.

Figure 6 is a sectional elevation of another form of telescoped pole joint, including an internal chain connection as an extensible connecting means.

Figure 7 is a perspective view of sectional fishing pole, having adjoining section ends connected by a joint similar to that shown in Figures 1 and 2.

Figure 8 is a perspective view of a tent having sectional poles, including a ridge pole, each pole being provided with joints, embodying my invention.

Figure 10:
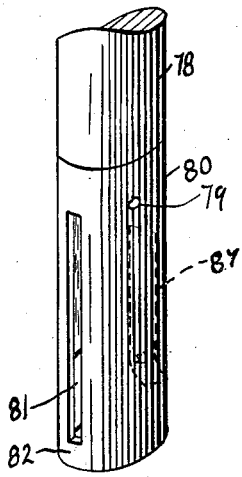
Figure 10 is a perspective view of the upper one of the jointed pole parts, shown in Figure 9, being shown with a slotted, tubular extension.

In the figures, three forms of joint, embodying my invention, are shown.

An adaptation of poles equipped with said joint is shown in connection with the tent 20, of Figure 8. Two upstanding poles 21 and 22, are shown, respectively, in the front and rear of the tent 20. 23 is a ridge pole shown at the top of the tent 20. The ridge pole 23 has two sections, 24 and 25, held in stiff alignment by the joint 26, while the upstanding poles 21 and 22 are each provided with joints 27 and 28, holding the adjoining parts of the three respective sections 29, 30 and 31, in stiff alignment. The joints 26, 27 and 28, can be made in accordance with some one of the forms of my invention, described below, and illustrated in the other figures.

Referring to that form of my invention on joints illustrated in Figures 1, 2 and 3, 32 and 33 are fragments of two adjoining pole sections, connected by the joint 34, which has two main members 35 and 36. The smaller diametered member 35 is fixed by the rivet 38, to the reduced part 37, of the pole section 32. 39 is a circumferential shoulder, against which, the member 35 butts. The members 35 and 36, are permanently, but loosely, connected in sliding, hinged relation by the following construction. Extending longitudinally of the member 36, and formed radially thereto, are the spaced parallel lips 40. Extending longitudinally of the member 35 and formed radially thereto, are the lips 41, preferably fixed together by spot welding, or otherwise. A longitudinal slot 42 is made through the lips 41. The slot 42 terminates at the cross portions 43 and 44. The spaced lips 40 slidingly fit over the lips 41 and at the outer end of the member 36, there is fixed a cross-rivet 45, passing through the spaced lips 40, and loosely crossing through the slot 42, being adapted to move and shoulder against the cross end portions 43 and 44, and which holds the members 35 and 36 connected in loosely hinged engagement. The member 36 closely fits onto the end of the pole section 33, and is secured thereto by the cross rivet 46. As shown in Figures 1 and 2, I provide a locking pin 47, fixed to one end of a leaf spring arm 48, which is secured at its other end, by a rivet 49, to the member 36. This pin 47 releasably fits into a hole 50, in the member 36, and into a hole 51, in the member 35, when the member 36 is slidingly fitted down over the member 35, as shown in Figure 2. The spring arm 48 is adapted normally to hold the pin 47 engaged with the hole 51, in the member 35, but can be withdrawn from these holes 51 and 50, and swung to one side, when about to disassemble the members 35 and 36, from telescopic engagement.

Considering now the form of joint shown in Figure 6, aligned with one another, are the fragments of pole sections 52 and 53. The section 52 has fixed thereto, by cross-rivet 54, a tubular extension 55, which extends beyond the end 56, of the section 52. This extension 55 slidingly fits onto the smaller diametered part 53ᵃ of the pole section 53, down to a circumferential shoulder 57, leaving the end 58, of the pole section 53, spaced from the end 56 of the pole section 52.

In the space 59 thus formed, is shown a nested chain 60, fixed at one end to the pole section 53 by the cross-rivet 61, and which is fixed at its other end to the cross-rivet 54. The chain 60 is of such a length as to permit the extension 55 to be pulled off the end 58, of section 53, yet this chain 60 prevents the sections 52 and 53, to which it is attached, from becoming completely separated. Fixed by the rivet 62, to the extension 55, is a leaf spring arm 63, which has a pin 64 releasably engaging the hole 65 in the extension 55 and entering pole section 53 at 66, there to be normally spring held by the leaf spring arm 63.

Referring next to the form of joint shown in Figures 9, 10, 11 and 12, the joint 67, connecting the adjoining ends of pole sections, has a flat central member 68, formed to have a projecting and comparatively large hook portion 69, integral with a shank portion 70. The hook portion 69 terminates in an end 71, having oppositely projecting lugs 72.

Figure 11:
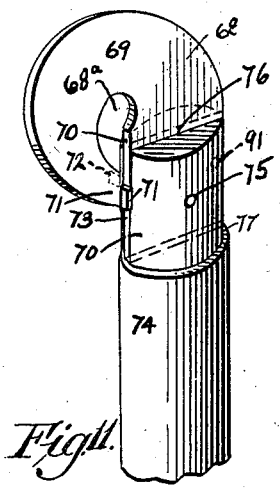
Figure 11 is a perspective view of the lower one of the jointed pole parts, with its attached joint member.

The shank portion 70 fits down into a central longitudinal slot 73, in the end of the pole section 74, and is fixed therein by a cross rivet 75. The hook portion 69 extends beyond the slotted end 76, of the pole section 74. Near the end of the pole section 74, at the slot 73, is a shoulder 77 above which the pole section 74 is smaller in diameter, as is shown in Figures 11 and 12.

In Figure 10 is shown a pole part 78, to which is fixed, a tubular extension 80, by means of a rivet 79. 80ᵃ is an inturned, holding tongue. The extension 79 has a longitudinal slot 81, terminating near the end of extension 80, at the cross-portion 82, of said extension. This slot 81 slidingly fits the flat hook portion 69, of the joint member 68.

The pole part 78 extends down inside the tubular extension 80 and terminates at 83, part way toward the outer end of extension 80. The pole part 78 has in its end, within extension 80, a central, longitudinal slot 84, the inner end 85, of said slot 84, being curved to fit the curved edge 86 of the hook 69, when the pole sections are aligned and pushed together so that extension 80 butts against shoulder 77, as shown in Figure 9.

Figure 9:
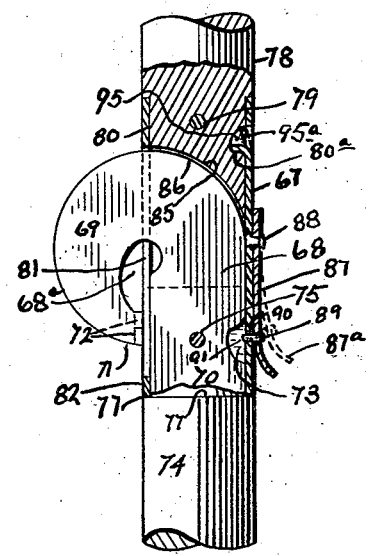
Figure 9 is a sectional elevation of another form of assembled pole joint, embodying my invention.
Figure 12:
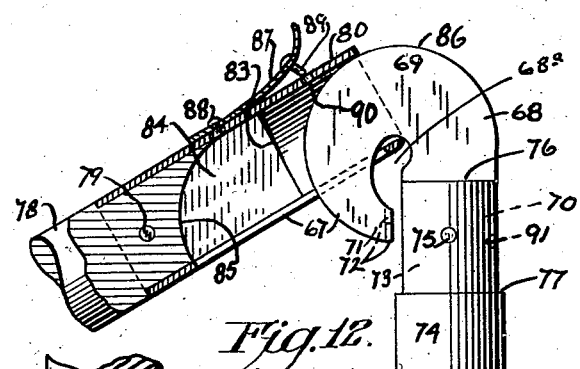
Figure 12 is a sectional elevation of the joint illustrated in Figure 9, but here shown having the co-acting members, disassembled from telescopic relation and turned at some angular relation to one another.
Figure 13:
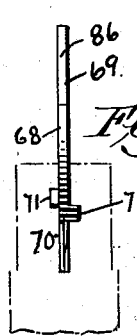
Figure 13 is a front edge elevation of the hook member of the joint, shown in Figure 11.

The releasable locking device shown in Figures 9 and 12 is similar to that shown in Figures 1, 5 and 6, having a leaf spring 87 riveted to tubular member 80 by rivet 88. Near the other end of 87, is fixed a pin 89, adapted by its position to releasably enter hole 90, in the member 80 and the notch 91 in the back edge of the shank portion 70 of the member 68.

Figure 15:
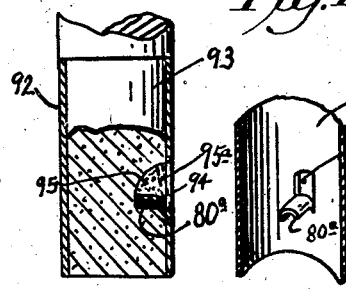
Figure 15 shows in section a tubular extension on a pole part end having a turned-in tongue, for holding the extension from coming off the pole section.
Figure 16:
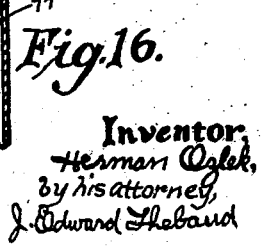
Figure 16 is a sectional perspective of the tubular extension per se, shown in Figure 15 illustrating the turned-in tongue.

The holding tongue 80ᵃ is shown on the tubular extension 92, in Figures 15 and 16. In Figure 15, the tongue 80ᵃ is shown as having been turned by a suitable punch into the wood pole part 93, upon which the extension 92 is mounted.

When the tongue 80ᵃ is forced by punch into the wood pole 93, it leaves an opening 94 as shown in Figures 16, and also leaves a curved open path 95 as it crushes down the wood in its advance. If, when the tongue 80ᵃ is being pushed into the wood of pole 93, and stops at the broken line position 95ᵃ, and left there, the partly forced in end of the tongue 80ᵃ will serve to hold the extension 92 from coming off the pole.

The operation of each of the three types of joint involves telescoping when the joint is assembled. The joint shown in Figures 1, 2 and 3, illustrates the joint members 35 and 36 as hinged together on the rivet 45 on which the members can turn from their relative position, shown in Figure 1, to one of axial alignment, then to be pushed into full telescopic engagement as shown in Figure 2, having the rivet 45 slide down the slot 42 to the position shown in Figure 2, to butt against the cross-portion 43. The cross-portion 44 prevents the members 35 and 36 from being pulled entirely free from one another. When the members of the joint are fully engaged as shown in Figure 2, then the pin 47 is engaged with the registering holes 50 and 51 and is there normally held in locking position by the leaf spring arm 48 to keep the joint members 35 and 36 from being pulled apart, until the pin 47 is released from the holes 50 and 51. This released position is shown in full lines in Figure 1 and in broken lines at 48a in Figure 2.

Considering the operation of the joint shown in Figure 6, where the tubular extension 55 fits the reduced part 53a down to the shoulder 57, the construction affords a space 59, between the pole ends 56 and 58 in which nests the chain 60, serving, when the joint is disassembled, to hold the pole sections from becoming entirely separated. The releasable locking device is similar to that having the locking pin 47 and described for the joint shown in Figures 1 and 2.

Considering the operation of the joint shown in Figures 9 and 12, in Figure 12 the thin hook member 68, is shown at an angle in sliding engagement with the slot 81, of the tubular member 80, with the cross-portion 82 loosely positioned in the eye 68a of the hook 68. The outstanding oppositely pointing lugs 71 and 72 serve to prevent the member 80 from becoming fully disengaged from the hook 69, when the pole sections 74 and 78 are swung parallel with one another. When the joint 67 is fully assembled as shown in Figure 9, the hook 69 fits snugly up into the slot 84, in the end of the pole section 78, having the curved edge 86, of the hook 69, fit close to, or against the curved bottom line 85, of the slot 84. This construction affords a stiffer aligning joint connecting the pole parts, inasmuch as the hook member 68, fits into a slot in each end of the joined and aligned members— the shank 70 permanently in the pole part 74, and the hook part 69 into the slot 84. The encircling tubular member 80, affords a binding strength to keep the slotted pole ends from splitting when the joint resists a bending strain transverse to the plane of the hook member 69.

Figure 14:
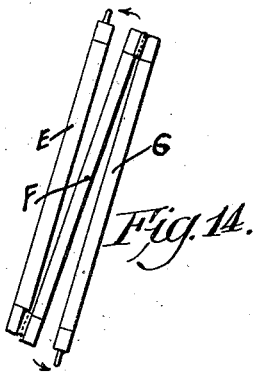
Figure 14 is an elevation of jointed pole parts, approaching a nested, or folded-together relation.

The forms of joints, above described, are designed to have the pole sections manipulated, either to bring the said sections into releasably, fixed telescopic, alignment, for use, for instance, in connection with a tent, as well as for folding the released sections together, to make a shorter package, for carrying purposes. Considering the joint shown in Figures 1, 2 and 3, Figure 1, illustrates an angular relation of the connected joint members 35 and 36, in the course of manipulating the joined pole sections, either toward fitted telescopic alignment as shown in Figure 2, or in the act of being folded together as illustrated in elevation, in Figure 4, wherein the spaced lips 40, of joint member 36, register in overlapping relation with the lips 41, of the joint member 35. The cross-section of pole sections may be round, as shown in Figure 3, or it may be square, as shown in Figure 5, or it may be triangular, hexagonal, or of any other cross section of tubular joint members, preferably conforming to the type of section of pole used; however the adjoining ends of the pole sections can be made round to fit round, tubular joint members.

Where it is desired to have the three pole sections folded closely together, the two joints can be so relatively positioned in angular relation, on the center pole section, that the end pole sections will swing in planes making an angle of about sixty degrees, as illustrated by the lines B—B and C—C, each of which lines lies in a plane passing through the axis of the mid-pole section and the lips, of the joint member, attached at an end, of the center pole section. In Figure 14, the three pole sections E, F and G are shown partly opened from a nested position.

While other modifications can be made, without departing from the spirit of my invention, I wish to include all such forms as come within the scope of the following claims.

I claim:

1. A joint for releasably connecting the adjoining ends of two supports in stiffly held relation, said joint comprising two mutually telescoping members, there being one member on each of said ends, one of said members being the outer one when said members are in telescopic relation, a longitudinal lip portion extending outwardly from the inner one of said members and having a longitudinal slot, a second lip projecting from the outer one of said members, and a pin fixed to said second lip and slidable in said slot.

2. A joint for releasably connecting the adjoining ends of two supports in stiffly held relation, said joint comprising an end part on one of said supports, a tubular extension fixed upon the end part of the other support and adapted to be disposed in telescopic relation with the first named end part, and slidable hinged connecting means between said end parts for permitting the separation of said supports, while holding said supports in hinged relation, the hinge axis being outside said ends and disposed in non-intersecting relationship ith respect to said ends.

3. A joint for releasably connecting adjoining ends of two supports in stiffly held relation, said joint comprising an end part on one of said supports, a tubular extension fixed upon the end part of the other support and adapted to be put in telescopic relation with the first named end part, said tubular extension having a longitudinal slot closed at the outer end, a flat hook member fixed in said first mentioned end part having its hook portion adapted to engage said slot in sliding relation and to project beyond said extension.

4. A joint made in accordance with claim 3, having in addition, side projecting means on the outer end of said hook to prevent the disengagement of said hook from said extension.

5. A joint for releasably connecting the adjoining ends of two supports in alinement comprising telescoping end members on said supports, and connecting means for permanently connecting said end members while permitting their telescopic assembling and disassembling in sliding and hinged engagement, the axis for hinged engagement being offset with respect to said ends and disposed in non-intersecting relationship with respect to said ends.

6. A joint for releasably connecting the adjoining ends of two supports in alinement comprising telescoping end members on said supports, connecting means for permanently connecting said end members while permitting their telescopic assembling and disassembling in sliding and hinged engagement, the axis for hinged engagement being offset with respect to said ends and disposed in non-intersecting relationship with respect to said ends, and releasable locking means for holding the end members in engagement.

7. A joint for releasably connecting the adjoining ends of two supports in alinement comprising telescoping end members on said supports, and connecting means for permanently connecting said end members while permitting their telescopic assembling and disassembling, said means including a longitudinally disposed slot in one of the members and the other of the members having a portion for hinged and sliding engagement with the slot, the axis for hinged engagement being offset with respect to said ends and disposed in non-intersecting relationship with respect to said ends.

8. A joint for releasably connecting the adjoining ends of two supports in alinement comprising two telescoping members, one of said members being fixed to each of said ends, and connecting means for permanently connecting said members while permitting their telescopic assembling and disassembling, said connecting means including a longitudinally disposed slot in one of the members, the other of the members having a portion for hinged and sliding engagement with the slot, the axis for hinged engagement being outside said ends and disposed in non-intersecting relationship with respect to said ends.

9. A joint for releasably connecting the adjoining ends of two supports in alinement comprising telescoping end members on said supports, and slidable hinged connecting means for permanently connecting said end members while permitting their telescopic assembling and disassembling, said connecting means including a longitudinally disposed slot in one of the members having a terminus for hinged engagement by a portion carried by the other of said end members, the hinge axis being offset with respect to said ends and disposed in non-intersecting relationship with respect to said ends.

HERMAN OZLEK.